United States Patent
Kurahashi et al.

(10) Patent No.: US 10,032,537 B2
(45) Date of Patent: Jul. 24, 2018

(54) SEPARATOR MATERIAL FOR POLYMER ELECTROLYTE FUEL CELL HAVING EXCELLENT CORROSION RESISTANCE, CONDUCTIVITY AND FORMABILITY, AND METHOD FOR MANUFACTURING SAME

(71) Applicants: Nakayama Amorphous Co., Ltd., Osaka (JP); Manabu Kiuchi, Tokyo (JP); USUI Kokusai Sangyo Kaisya, Ltd., Shizuoka (JP); Yamanaka Eng. Co, Ltd., Osaka (JP)

(72) Inventors: Ryurou Kurahashi, Osaka (JP); Junji Takehara, Osaka (JP); Shigeo Kakudou, Osaka (JP); Tsunehiro Mimura, Osaka (JP)

(73) Assignees: NAKAYAMA AMORPHOUS CO., LTD., Osaka (JP); Manabu Kiuchi, Tokyo (JP); USUI KOKUSAI SANGYO KAISYA, LTD., Shizuoka (JP); YAMANAKA ENG. CO., LTD., Osaka (JP)

( * ) Notice: Subject to any disclaimer, the term of this patent is extended or adjusted under 35 U.S.C. 154(b) by 527 days.

(21) Appl. No.: 14/404,509

(22) PCT Filed: May 28, 2013

(86) PCT No.: PCT/JP2013/064701
§ 371 (c)(1),
(2) Date: Nov. 28, 2014

(87) PCT Pub. No.: WO2013/180094
PCT Pub. Date: Dec. 5, 2013

(65) Prior Publication Data
US 2015/0111132 A1    Apr. 23, 2015

(30) Foreign Application Priority Data
May 28, 2012    (JP) ................... 2012-121286

(51) Int. Cl.
H01M 2/14    (2006.01)
H01M 2/16    (2006.01)
(Continued)

(52) U.S. Cl.
CPC ............. *H01B 1/18* (2013.01); *B22D 23/003* (2013.01); *B22F 3/115* (2013.01); *C21D 1/18* (2013.01);
(Continued)

(58) Field of Classification Search
None
See application file for complete search history.

(56) References Cited

U.S. PATENT DOCUMENTS 4,621,031 A    11/1986   Scruggs
4,647,305 A *  3/1987   Kumai .................. B22F 9/008
                                                  264/12

(Continued)

FOREIGN PATENT DOCUMENTS

CN    102364738 A    2/2012
EP    2369668 A2    9/2011
(Continued)

OTHER PUBLICATIONS

Sung-Chul Kim, et al. "Production of Ni65Cr15P16B4 Metallic Glass-Coated Bipolar Plate for Fuel Cell by High Velocity Oxy-Fuel (HVOF) Spray Coating Method," Materials Transactions, vol. 51, No. 9 (2010) pp. 1609-1613, The Japan Institute of Metals.

(Continued)

*Primary Examiner* — Katie L Hammer
(74) *Attorney, Agent, or Firm* — Bacon & Thomas, PLLC

(57) ABSTRACT

A thin plate is prepared by an ultraquenching transition control injector with a mixture of a metal powder having corrosion resistance to form a matrix and a powder having conductivity, as a raw material. When the matrix of the thin (Continued)

plate is crystal-structure metal, the plate can be formed at room temperature, and when the matrix is metallic glass, the plate can be formed in a supercooled liquid state. Therefore the plate can be finished into a separator with an intended shape.

14 Claims, 7 Drawing Sheets

(51) Int. Cl.
*C22C 45/00* (2006.01)
*H01M 8/0206* (2016.01)
*H01B 1/18* (2006.01)
*C23C 4/06* (2016.01)
*C23C 4/10* (2016.01)
*C23C 4/12* (2016.01)
*C22C 45/04* (2006.01)
*C22C 19/05* (2006.01)
*C22C 1/00* (2006.01)
*C22C 1/02* (2006.01)
*H01M 8/0223* (2016.01)
*B22D 23/00* (2006.01)
*C21D 1/18* (2006.01)
*B22F 3/115* (2006.01)
*B22D 23/06* (2006.01)
*H01M 8/1018* (2016.01)
*C22C 1/04* (2006.01)
*C22C 1/10* (2006.01)

(52) U.S. Cl.
CPC .............. *C22C 1/002* (2013.01); *C22C 1/02* (2013.01); *C22C 19/058* (2013.01); *C22C 45/00* (2013.01); *C22C 45/04* (2013.01); *C23C 4/06* (2013.01); *C23C 4/10* (2013.01); *C23C 4/12* (2013.01); *H01M 2/145* (2013.01); *H01M 2/1646* (2013.01); *H01M 8/0206* (2013.01); *H01M 8/0223* (2013.01); *B22D 23/06* (2013.01); *B22F 2998/10* (2013.01); *C22C 1/0433* (2013.01); *C22C 1/1036* (2013.01); *H01M 2008/1095* (2013.01); *H01M 2250/10* (2013.01); *H01M 2250/20* (2013.01); *H01M 2250/30* (2013.01); *Y02B 90/14* (2013.01); *Y02B 90/18* (2013.01); *Y02P 70/56* (2015.11); *Y02T 90/32* (2013.01)

(56) References Cited

U.S. PATENT DOCUMENTS

| | | | |
|---|---|---|---|
| 4,762,678 A * | 8/1988 | Dolgin | B22F 3/007 419/28 |
| 2002/0187379 A1 | 12/2002 | Yasuo et al. | |
| 2003/0148024 A1 * | 8/2003 | Kodas | C23C 18/06 427/125 |
| 2005/0051431 A1 | 3/2005 | Ohtani | |
| 2007/0144621 A1 * | 6/2007 | Farmer | C22C 45/00 148/403 |
| 2008/0248222 A1 * | 10/2008 | Ohara | B32B 15/01 428/34.6 |
| 2010/0035120 A1 * | 2/2010 | Sato | H01M 8/0206 429/524 |
| 2011/0135812 A1 * | 6/2011 | Kim | H01M 8/0206 427/115 |

FOREIGN PATENT DOCUMENTS

| | | |
|---|---|---|
| JP | H10228914 A | 8/1998 |
| JP | 2001214286 A | 8/2001 |
| JP | 2003187829 A | 7/2003 |
| JP | 2003193206 A | 7/2003 |
| JP | 2005126795 A | 5/2005 |
| JP | 2006210320 A | 8/2006 |
| JP | 2006339045 A | 12/2006 |
| JP | 2010022895 A | 2/2010 |
| WO | 2006034054 A1 | 3/2006 |
| WO | 2007038882 A1 | 4/2007 |
| WO | 2013105297 A1 | 7/2013 |
| WO | 2013105304 A1 | 7/2013 |

OTHER PUBLICATIONS

Search Report of corresponding Chinese Patent Application No. 201380028380.3 dated May 3, 2016.
Search Report issued in Chinese patent application 201380028380 dated May 3, 2016.
Extended European Search Report of the corresponding European patent application No. 13796865.7 dated Apr. 7, 2016.

* cited by examiner

SEPARATOR MATERIAL FOR POLYMER ELECTROLYTE FUEL CELL HAVING EXCELLENT CORROSION RESISTANCE, CONDUCTIVITY AND FORMABILITY, AND METHOD FOR MANUFACTURING SAME

TECHNICAL FIELD

The present invention relates to a metallic separator having excellent corrosion resistance, conductivity, and formability as an industrial material, or a thin plate used as the material of the separator, and the manufacturing method therefor.

BACKGROUND ART

A polymer electrolyte fuel cell (PEFC) extracts energy as electric power from the reaction between hydrogen and oxygen to generate water, which is expected to be useful for future society as a clean power source with no $CO_2$ emission. The use of PEFCs, such as for automobiles, household use fuel cells, and mobile phones, is well known. A component called a separator is used inside the PEFCs. This is mainly a component that forms a flow path for hydrogen and oxygen and allows electricity to flow between cells.

For the material of PEFC separators, two kinds of material, carbon and metal, are generally used. On the basis of the reasoning that carbon is poor in workability and thick, thus increasing size, metallic separators are anticipated in automotive PEFCs. The development thereof has been underway not only at manufacturers but also at research institutions such as universities.

In Non Patent Literature 1, formability, corrosion resistance, contact resistance, and power generation characteristics at a supercooled liquid temperature range are reported for the separator of a metallic glass material.

Patent Literature 1 discloses a manufacturing method in which stainless steel is applied as a base, and in order to make the stainless steel conductive as well, a passive layer is passed through with a deposition, thereby increasing the conductivity between the stainless interior and its surface. A passive layer has high electric resistance, so that contact resistance increases (conductivity deteriorates) when the surface of a material is covered therewith.

Also in Patent Literatures 2 and 3, the material, in which a passive layer is formed on a surface thereof to improve corrosion resistance, is selected, and similarly as described above, special treatment such as plating is performed on the surface in order to improve conductivity.

In Patent Literature 4, the manufacturing apparatus for preparing an amorphous thin plate and the method therefor are disclosed, allowing for a thin plate in a size required for PEFC separators. FIG. 1 shows the structure of an injection gun as a primary device. With this injection gun, a film is formed on a substrate surface while flying powder particles are quenched, finally followed by the release of the film from the substrate so as to obtain an amorphous thin plate.

CITATION LIST

Non Patent Literature

[NPL 1] Masanori Yokoyama, Shinichi Yamamura, Hisamichi Kimura, Akihisa Inoue; "Hot Press Workability of Ni-based Metallic Glass in Supercooled Liquid State and Prototype of Fuel Cell Separators," *Powder and Powder Metallurgy*, 54 (2007), 773-777

PATENT LITERATURE

[PTL 1] Japanese Unexamined Patent Application Publication No. 2003-193206
[PTL 2] Japanese Unexamined Patent Application Publication No. 2006-210320
[PTL 3] Japanese Unexamined Patent Application Publication No. H10-228914
[PTL 4] Japanese Patent Publication No. 4579317

SUMMARY OF INVENTION

Technical Problem

The practical use of metallic separators for PEFCs has been considered difficult because of problems in obtaining a material satisfying all corrosion resistance, conductivity, formability, and cost. In Non Patent Literature 1 and Patent Literature 1, it is said that non-conductive oxide grows on a material surface when applying current, so that power generation characteristics degrade. In Patent Literatures 2 and 3, there seems to be a cost issue for practical uses because special treatment is required for a surface and an expensive material is used. The present invention proposes a metallic separator for PEFCs that satisfies all corrosion resistance, conductivity and formability without requiring a complex procedure, or a thin plate applicable as a material for the separator and the like, and a manufacturing method therefor.

Solution to Problem

In the present invention, the ultraquenching transition control injector as shown in FIG. 1 or FIG. 2 is used so as to prepare a metallic thin plate. These injectors are capable of forming, by using a powder raw material, a quenched coating of a melted powder material, on a substrate surface, and further preparing a quenched thin plate obtained by releasing the coating from the substrate. When a powder material having a composition which can easily become amorphous is used, the injector is capable of obtaining an amorphous coating and thin plate. Specifically, the powder material that was completely melted in flame during flying is quenched with refrigerant such as nitrogen gas and mist before reaching the substrate. As a result, the coating formed on the substrate surface will be amorphous. The difference between the ultraquenching transition control injectors in FIG. 1 and FIG. 2 is the width of coatings formed at a time. In FIG. 1, the width is 15 mm, and in FIG. 2, the width is 300 mm. With either ultraquenching transition control injector, coatings and thin plates of the same quality may be obtained. However, in considering production efficiency per ultraquenching transition control injector, the ultraquenching transition control injector in FIG. 2 is more suitable, so that in the present invention, mainly this injector is used to prepare thin plates.

In the present invention, for the powder material supplied to the above-mentioned ultraquenching transition control injector, conductive powder is mixed into the composition that tends to become amorphous, or the like.

Normally in the process of solidifying the metal having a composition that becomes amorphous, when there is a certain substance resulting in a core of crystallization, such as the conductive powder that is mixed this time, the metal is easily crystallized, instead of being amorphous, and then solidified. However, the use of the ultraquenching transition control injector as in FIG. 1 and FIG. 2 can prevent crystallization. This is because the metal powder having a composition that becomes amorphous and the conductive powder are not in a mixed state during flying, but these powders fly discretely and (the metal powder having a composition to be amorphous) solidify. That is, by using the ultraquenching transition control injector as in FIG. 1 or FIG. 2 with the powder material in which the metal powder having the composition that can become easily amorphous and the conductive powder are mixed, it is possible to prepare a thin plate having the conductive material mixed in a metal matrix which is amorphous or includes an amorphous structure.

For this, in order to actually confirm this beforehand, $Ni_{65}Cr_{15}P_{16}B_4$ as the metal powder having a composition that becomes amorphous and C, $B_4C$ as the conductive powder were selected, and an amorphous thin plate was prepared by the above-described method with the use of the ultraquenching transition control injector in FIG. 1. When an amorphous rate was calculated from the thermal energy of the thin plate measured by DSC (with the thermal energy of the amorphous $Ni_{65}Cr_{15}P_{16}B_4$ ribbon as 100%), the thin plates mixed with either C or $B_4C$ conductive powder had the amorphous rate of 89 to 95%. This result is the same as the $Ni_{65}Cr_{15}P_{16}B_4$ thin plate without mixed conductive powder. It was confirmed that the amorphization of $Ni_{65}Cr_{15}P_{16}B_4$ was not affected by mixed conductive powder. It is noted that DSC stands for Differential Scanning calorimetry, which measures a difference in amount of heat between a measurement sample and a reference material. With this measurement, it is possible to obtain a thermal energy value when a measurement sample is crystallized from the amorphous state.

For a metal material having corrosion resistance as a base material (matrix), the use of amorphous and crystal-structure metal such as stainless steel can be considered. Metallic glass, though amorphous it is, has a temperature range in which to turn into a supercooled liquid, so that if the metallic glass is formed in this temperature range, it is possible to perform processing at excellent dimensional accuracy without generating cracks. Also, in the stainless steel, in a case where a plate-shaped product is produced with a general manufacturing method, when boron (B) or the like is added in large quantity to form a conductive deposition, boron (B) or the like dissolves in a matrix in a large amount to deteriorate workability (Solution Hardening). However, when the above-described manufacturing method using the ultraquenching transition control injector in FIG. 1 or FIG. 2 is used, the component of the conductive material powder to be mixed does not dissolve in a stainless matrix and exists solely in a thin plate, so that workability deterioration is not expected to be generated. FIG. 4 shows a cross-sectional picture of a thin plate that was actually prepared. This is the cross-sectional picture of a thin plate that was formed from the powder material, which was the mixture of SUS316L powder and 2.5 wt % of $B_4C$, with the ultraquenching transition control injector in FIG. 2. A dark gray area in a dotted circle is $B_4C$. Furthermore, FIG. 5 shows a result of an EDX analysis of SUS316L matrix points in this cross-sectional picture. It was actually confirmed that B did not dissolve in the stainless matrix as described above because the peak of B was not detected herein. EDX stands for Energy Dispersive X-ray Spectrometry. This is an element analysis method, which detects X-rays generated when a sample is irradiated with electron beams, with an energy dispersive detector, and examines substances that make up the sample and its concentrations on the basis of the energy and intensity of the X-rays. In FIG. 5, the horizontal axis corresponds to energy; and the vertical axis corresponds to intensity.

The metal materials to be examined in the present invention form a passive layer to exhibit corrosion resistance, so that the contact resistance is considered large unless treated. Therefore, in order to reduce the contact resistance, it is required to mix a conductive material powder allowing electricity to flow in the passive layer.

For the conductive powder material, the use of a non-metallic C-based powder was considered. The reason for this is that most of the non-metallic conductive powders remain stable at ph=3 and 80° C. as the driving environment of PEFC, and these powders are inexpensive; however, as long as cost and the effect of characteristics match, various components may be used for the conductive powder. That is because the ultraquenching transition control injector for use in the present invention melts a metal powder material at about 2000° C. with reducing flame with a reduced supply of oxygen, so that when the melting point of conductive powder is higher than that temperature, the conductive powder can remain in a thin plate without melting. FIG. 4 shows a specific example of a thin plate that was actually prepared by the ultraquenching transition control injector. It is possible to find the remaining $B_4C$ (in a dotted circle) in the thin plate, and this $B_4C$ is also one of the components to be used as the conductive powder.

Advantageous Effects of Invention

The present invention enables the production of metallic separators for PEFCs having excellent corrosion resistance, conductivity, and formability at low cost. As for the thickness of thin plates, in a case of using steel coils, an increase in rolling costs may be considered as the plates become thinner. However, in the manufacturing method of the present invention, a reduction in plate thickness can be easily adjusted by decreasing the feed rates of the material powder, decreasing the relative speeds between a substrate and an injection gun, etc.

The thin plate of the present invention has high corrosion resistance at a matrix portion and has excellent conductivity because of having a conductive material. The plate is also advantageous in terms of formability and manufacturing costs, so that it is highly suitable as a metallic separator for PEFCs.

DESCRIPTION OF EMBODIMENTS

1. Preparation of Thin Plate and Test Specimen (Corrosion Resistance, Contact Resistance)

For a metal material for use in an injection gun (ultraquenching transition control injector), a gas atomized powder having the composition of $Ni_{65}Cr_{15}P_{16}B_4$ (at %) and being classified as +38/−63 μm in diameter was used. This is a composition that solidifies as metallic glass when quenched, and this composition was selected also in the present invention in order to achieve the formation in a supercooled liquid range.

For a conductive powder to be mixed in the metal material mentioned above, artificial graphite (AGB-5 from Ito Graphite Co., Ltd.) having the average particle size of 5 μm was used (hereinafter, referred to as carbon). This powder is obtained by pulverizing artificial graphite electrodes, and is available at low cost.

$Ni_{65}Cr_{15}P_{16}B_4$ and 0.3 wt % of carbon powder were mixed and stirred to obtain a material for injection. After mixing, water was removed by keeping the material warm in a drying oven under the condition of 80° C. for two hours. This is performed for a purpose of achieving stable powder supply without clogging or the like inside a supply path during the injection of the powder material.

Figure 1:
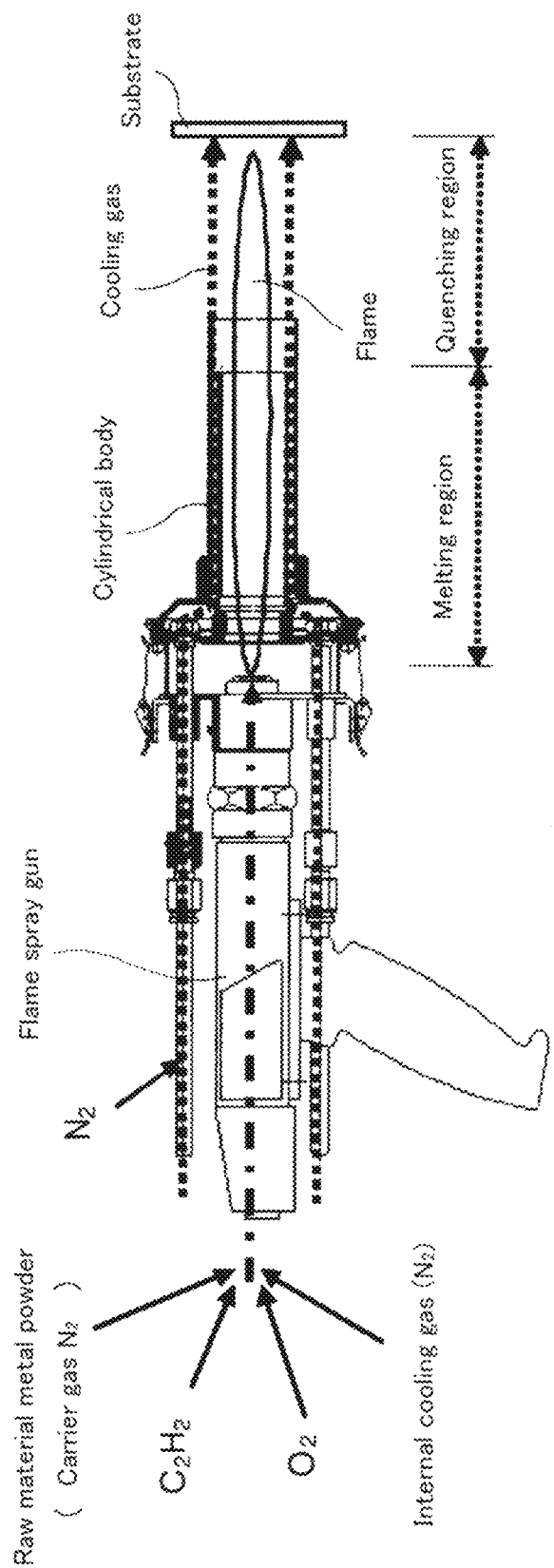
FIG. 1 is a side view showing the usage of an ultraquenching transition control injector.
Figure 2A:
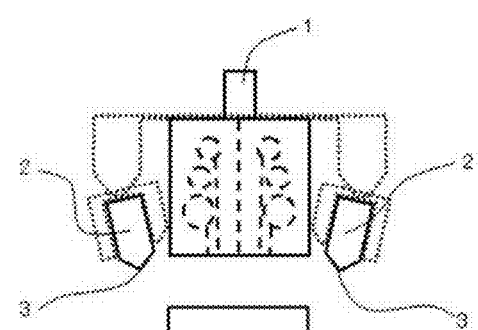
FIG. 2A is a side view and FIG. 2B is a bottom view each showing a large ultraquenching transition control injector.
Figure 2B:
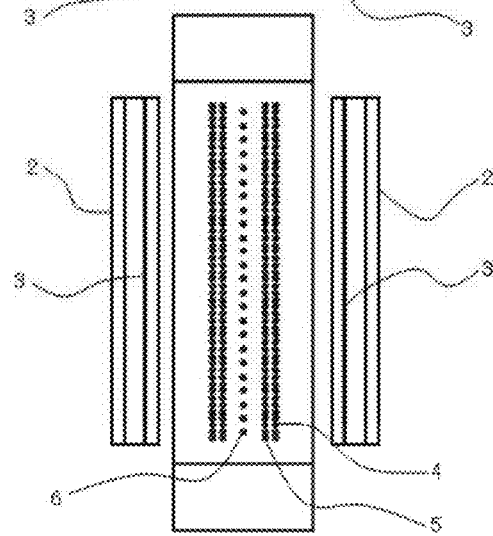

For the injection gun, the ultraquenching transition control injector shown in FIG. 2 was used. Mixed gas of oxygen and propane is used for fuel, and combustion flame is ejected from flame vents 5 outside of powder ejection ports 6, which are arranged at equal intervals in the widthwise direction. The powder material ejected from the powder ejection ports 6 is completely melted once in the combustion flame. The material is deposited on the surface of a substrate while being quenched, right after being melted, with a refrigerant mist ejected from a mist ejection port 3 arranged outside the powder ejection ports 6, thereby forming a film. This injection gun injects the material uniformly in the widthwise direction, and thus, it is possible to prepare a thin plate having a uniform thickness in the widthwise direction.

Figure 3:
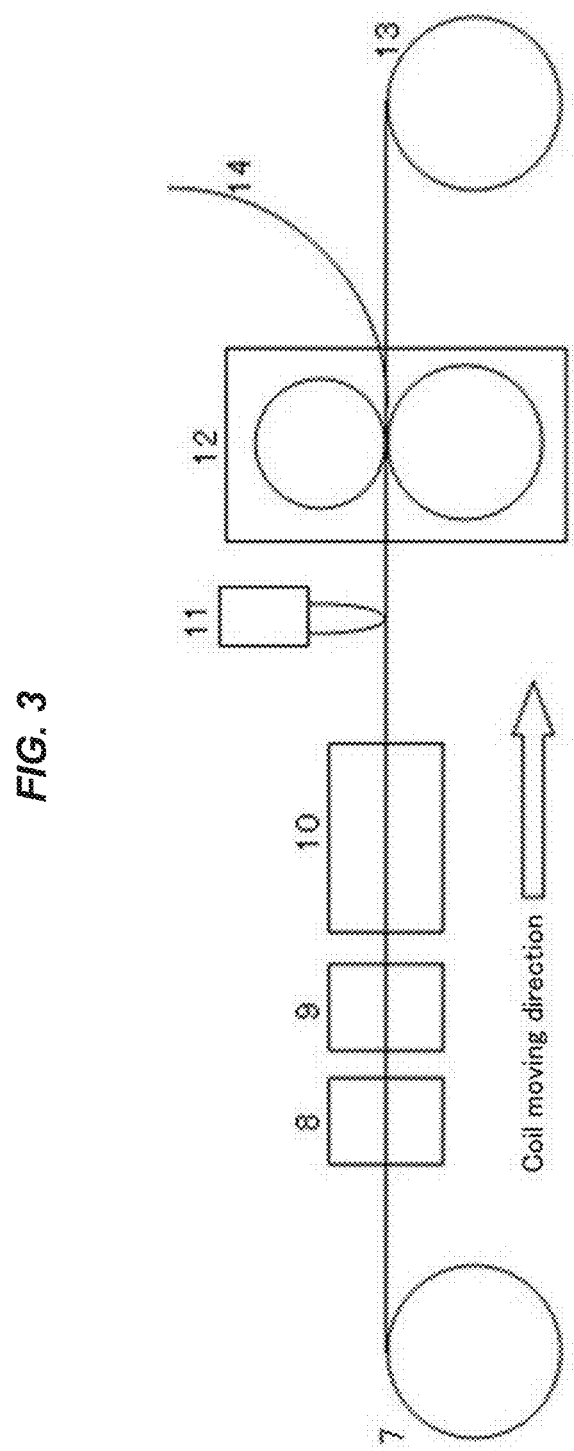
FIG. 3 is a side view showing the overall production line of thin plates.
Figure 4:
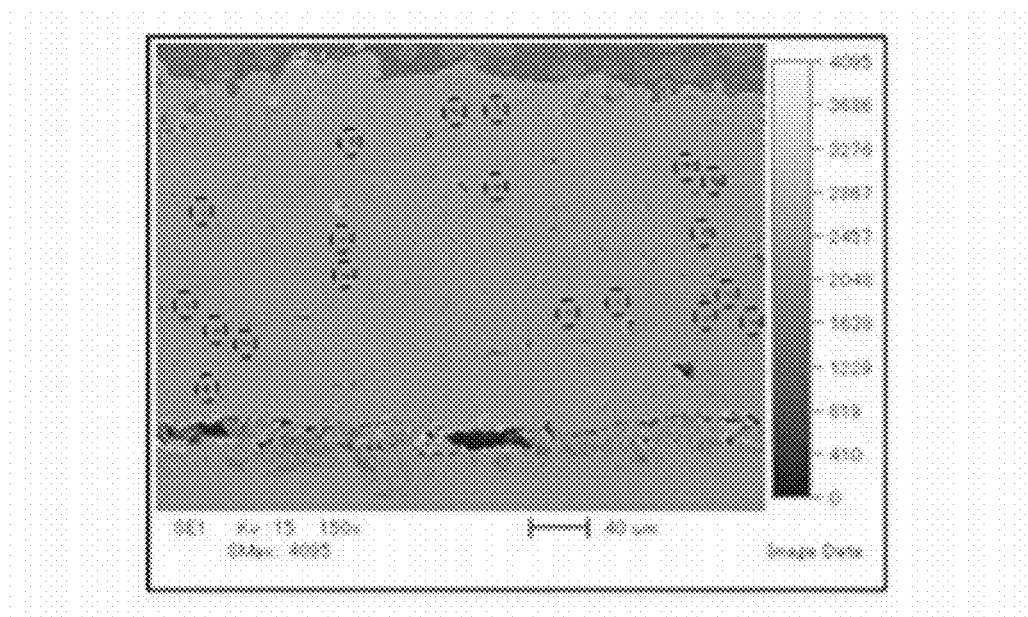
FIG. 4 is microscopic structure photography showing the cross section of a SUS316L thin plate mixed with $B_4C$ at 2.5 wt %.
Figure 5:
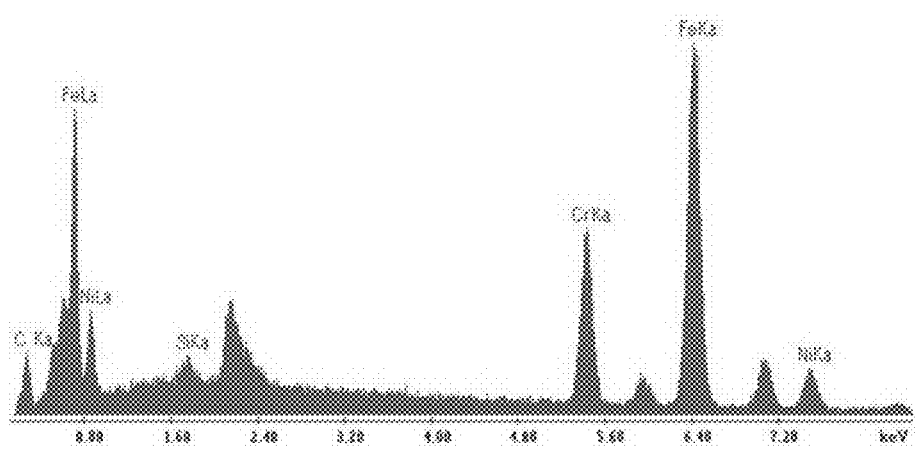
FIG. 5 is a graph showing the EDX result of a SUS316L matrix of FIG. 4.

The above-described ultraquenching transition control injector was installed in the thin plate production line shown in FIG. 3. A pickled steel coil of 2 mm in thickness×300 mm in width is set between a payoff reel 7 and a coil winder 13, and the coil is moved toward the coil winder 13. First, the coil is heated with propane flame by a preheater 8. Then, after the coil shape was corrected by a leveler 9, the coil was heated up to the target temperature of 250° C. by a thin plate substrate heating and heat-equalizing device 10.

Figure 6:
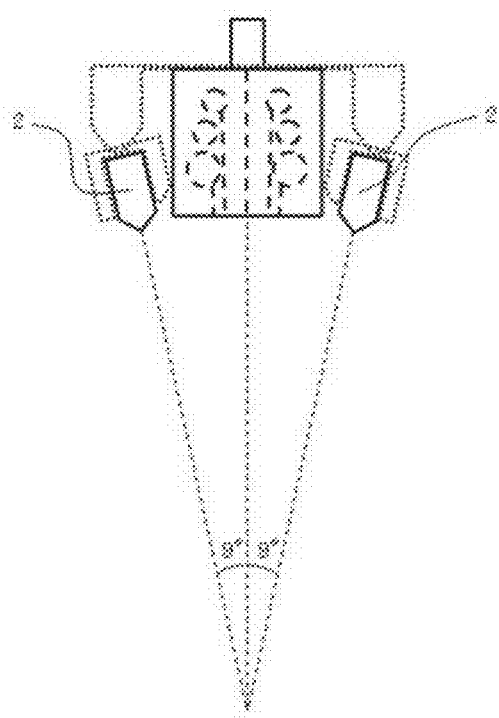
FIG. 6 is a side view showing upstream and downstream mist angles of the ultraquenching transition control injector of FIG. 2.

On the surface of the coil that was heated up to the target temperature of 250° C., a film was formed with the mixed powder by an ultraquenching transition control injector 11. Immediately after the film formation, 10% reduction was applied thereon with a rolling mill 12. Before being wound on the coil winder 13, the film was released from the coil, thus obtaining a thin plate 14. At this time, the film temperature is 220 to 280° C. right after the reduction applied with the rolling mill 12. It is noted that in a series of operations, a coil speed was constant at 5.7 m/min. The above-described condition for manufacturing thin plates is shown in Table 1. An upstream mist angle and a downstream mist angle in Table 1 show a positional relationship, relative to the coil movement direction, of a mist ejection nozzle 2 and an inclination from the direction at right angles to the plane of the coil. The conditions are illustrated in FIG. 6.

TABLE 1

| | |
|---|---|
| Feed Rate of Alloy Powder (g/s) | 30 |
| Flow Rate of Propane Gas (m³/h) | 34 |
| Oxygen Flow Rate (m³/h) | 120 |
| Rectified Nitrogen Flow Rate (m³/h) | 400 |
| Injection Distance to Coil (mm) | 600 |
| Upstream Mist Angle (°) | 9 |
| Upstream Mist Flow Rate (liter/min) | 4 |
| Downstream Mist Angle (°) | 9 |
| Downstream Mist Flow Rate (liter/min) | 4 |
| Coil Surface Temperature Before Injection | 250 |
| Rolling Speed (m/min) | 5.7 |

Figure 7:
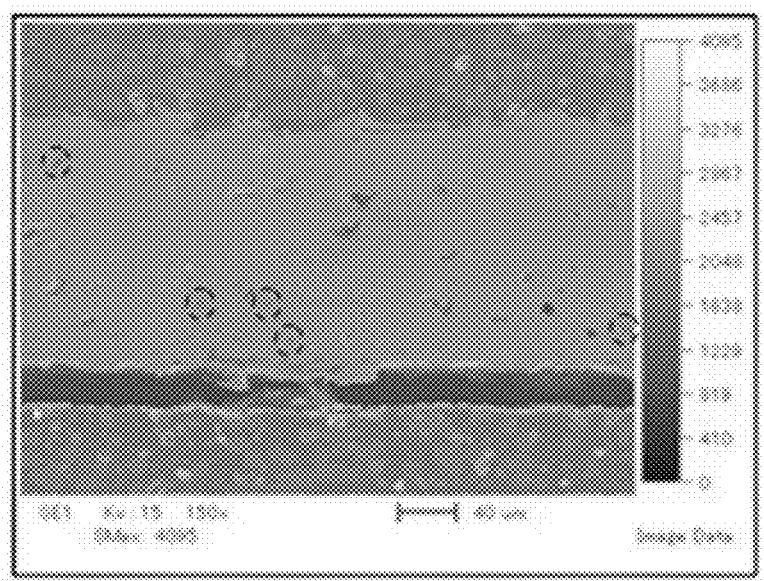
FIG. 7 is microscopic structure photography showing the cross section of a $Ni_{65}Cr_{15}P_{16}B_4$ thin plate mixed with C at 0.3 wt %.

The thin plate obtained thereby had a size of 300 μm in thickness×300 mm in width. The thin plate was confirmed by DSC to have 85% amorphous rate in comparison with an amorphous ribbon material which has 100% amorphous rate. FIG. 7 is a cross-sectional picture of the thin plate obtained thereby. It is observed that C (in a dotted circle) remains in the $Ni_{65}Cr_{15}P_{16}B_4$ matrix.

Further, in order to confirm a difference in contact resistance between the cases with or without the conductive powder, an amorphous thin plate was also prepared from $Ni_{65}Cr_{15}P_{16}B_4$ powder having no mixed carbon powder, in the same procedures as described above. Finally, the following two types of thin plates were prepared.

TABLE 2

| Sample No. | Composition of Metal Matrix (at %) | Conductive Powder | Mixing Rate of Conductive Powder (wt %) |
|---|---|---|---|
| 1 | $Ni_{65}Cr_{15}P_{16}B_4$ | None | — |
| 2 | $Ni_{65}Cr_{15}P_{16}B_4$ | C | 0.3 |

2. Contact Resistance Test

The prepared thin plates were cut out in the size of 35-mm square with a micro cutter. The amorphous thin plates were treated by a router to have a flat and smooth surface on the side opposite to the coil (having had a surface roughness of about Ra 10 μm since they remained as they were after injection).

In order to passivate the material surface, the plates were immersed for two hours in sulfuric acid of ph=3 at 80° C. and then experimented on.

Figure 8:
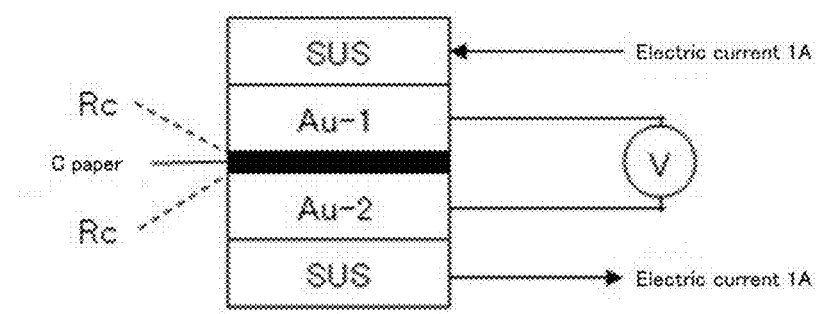
FIG. 8 is a diagram illustrating a circuit 1 of measurement.

A constant current of 1 A was applied to a circuit shown in FIG. 8 to measure a potential difference between gold layers (Au-1-Au-2), and a resistance value was calculated on the basis of Ohm's law. This resistance value, being a contact resistance of Au-Carbon (C) paper existing at two locations in the circuit, was divided by 2 to give Rc (contact resistance of Au—C paper). To determine Rc per 1 kgf/cm², contact pressure was changed from 1 to 7 kgf/cm².

Figure 9:
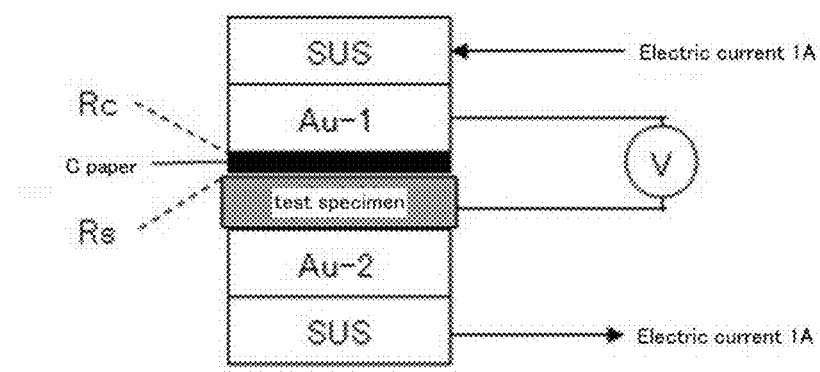
FIG. 9 is a diagram illustrating a circuit 2 of measurement.

Then, a constant current of 1 A was similarly applied to a circuit shown in FIG. 9 to measure a potential difference between Au-1 and the test specimen, and a resistance value Ra was calculated on the basis of Ohm's law. Similar to the above description, to determine Ra per 1 kgf/cm², contact pressure was changed from 1 to 7 kgf/cm². Finally, according to the formula below, a contact resistance value Rs between the test specimen and the C paper was calculated, and conductivity was evaluated on the basis of this value.

$Rs = Ra - Rc$

Figure 10:
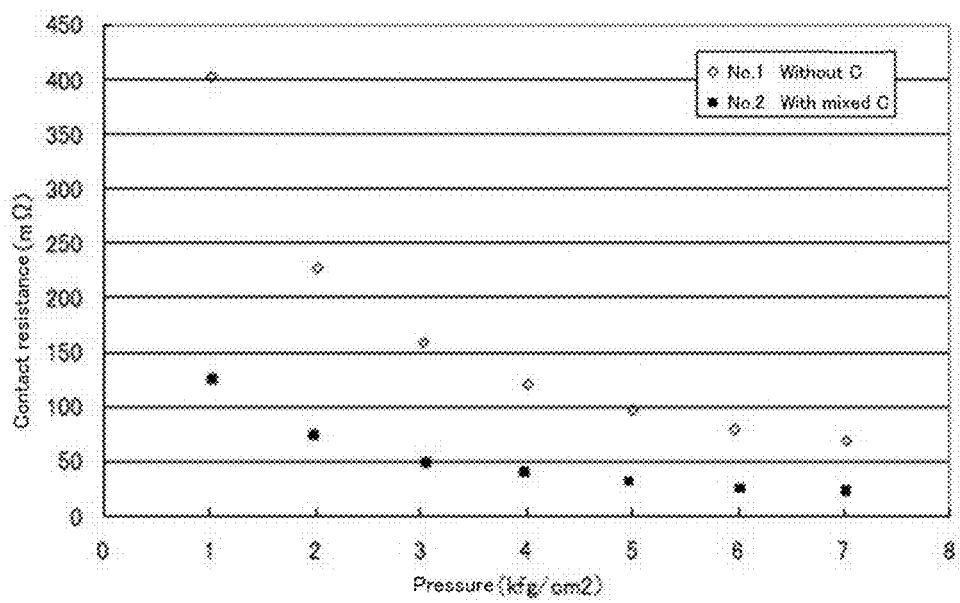
FIG. 10 is a graph showing the result of contact resistance measurement.

FIG. 10 shows the measurement result of contact resistance. The amorphous material of $Ni_{65}Cr_{15}P_{16}B_4$ exhibits corrosion resistance by passivation on its surface. On the surface of both test specimens, a passive layer is formed during the sulfuric acid immersing process before the test. A reason why the contact resistance value of the C admixture is low at any contact pressure may be that C, a conductor, is present also in the passive layer. Accordingly, it is possible to say that the contact resistance that increases with passivation may be reduced by preparing a metallic thin plate with a powder material mixed with C by using an ultraquenching transition control injector.

3. Corrosion Resistance Test

The prepared No. 2 thin plate (with mixed C) was cut out in the size of 20-mm square with a micro cutter, and was then experimented. As an immersion solution, sulfuric acid of ph=3 (80° C.) was prepared, and immersion was performed for 24 hours. The weight of the test specimen was measured before and after immersion, and corrosion rate (μm/year) was calculated from weight changes and specific gravity.

The result was 3 μm/year, confirming that it had sufficient corrosion resistance as a separator for PEFCs.

4. Press Formability

The prepared No. 2 thin plate was cut out in the size of 100-mm square, and was then experimented. Before processing, both upper and lower dies of a press machine were sufficiently preheated. A test specimen was set between the upper and lower dies warmed to a preset temperature of 390° C., held for two minutes under a micro load and then held for another two minutes with plastic deformation being applied thereto.

Figure 11:
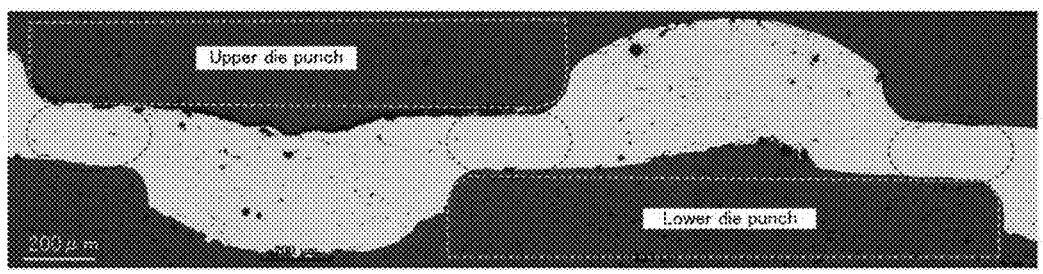
FIG. 11 is microscopic structure photography showing the cross section of a pressed $Ni_{65}Cr_{15}P_{16}B_4$ thin plate mixed with C at 0.3 wt %.

FIG. 11 is a cross-sectional picture after the pressing is applied. It was observed that a flat thin plate of 300 μm in thickness was formed by the punch with the upper and lower dies without cracked. Additionally, at a location in a dotted circle where a distance between the dies becomes small, 150 μm, pores in the thin plate have disappeared due to compressive deformation, which leads to an improvement in internal quality as well as in forming.

The test specimens after the press forming also measured by DSC to detect the presence of progression to crystallization. However, there was no change in amorphous rates before and after the press processing, and it was also found that there was no degradation issue in characteristics such as corrosion resistance.

It is noted that the matrix was metallic glass in the above description, therefore, forming was performed in a supercooled liquid state, however, when the matrix of the thin plate is crystal-structure metal, forming can be performed at room temperature. In any case, by the press forming or the like of the thin plate according to the invention, the plate may be finished into the intended separator shape.

As described above, it was confirmed that a thin plate with a mixed conductive powder of the present invention can satisfy conductivity, corrosion resistance, and press formability necessary for a separator for PEFCs.

REFERENCE SIGNS LIST

1 Powder Supply Pipe
2 Mist Ejection Nozzle
3 Mist Ejection Port
4 Inert Gas Ejection Port
5 Flame Vent
6 Powder Ejection Port
7 Payoff Reel
8 Preheater
9 Leveler
10 Thin plate substrate heating and heat-equalizing device
11 Ultraquenching Transition Control Injector
12 Rolling Mill
13 Coil Winder
14 Released Thin Plate

The invention claimed is:

1. A thin plate comprising a conductive material component that exists, without dissolving, in a metal matrix exhibiting corrosion resistance by passivation, and the thin plate being subjected to press forming, wherein the metal matrix includes an amorphous structure at a rate of 85% or more.

2. The thin plate according to claim 1, wherein the conductive material component is C or $B_4C$.

3. The thin plate according to claim 1, wherein an internal pore is crimped by the press forming.

4. A method for manufacturing a thin plate, the thin plate comprising a conductive material component that exists, without dissolving, in an amorphous metal matrix which includes an amorphous structure at a rate of 85% or more and exhibiting corrosion resistance by passivation, the method comprising:

injecting metal used for the metal matrix and the conductive material from an injection gun with flame toward a substrate so that the metal is melted, and then cooling with cooling gas before the flame reaches the substrate so as to provide a composite plate with a coating laminated on the substrate; and applying press-forming to the coating.

5. The method for manufacturing the thin plate, according to claim 4, wherein the coating is released from the composite plate to provide the thin plate.

6. The method for manufacturing the thin plate, according to claim 4, wherein the press-forming crimps a pore in the coating and the thin plate.

7. The method for manufacturing the thin plate, according to claim 4, wherein metal having a composition that becomes amorphous by quenching is used as the metal, to make the metal matrix in the coating and the thin plate include an amorphous structure.

8. A separator for a polymer electrolyte fuel cell, the separator being formed of the thin plate made by the method according to claim 4.

9. The thin plate according to claim 2, wherein an internal pore is crimped by the press forming.

10. The method for manufacturing the thin plate according to claim 5, wherein the press-forming is applied to the coating after the coating is released from the composite plate.

11. The method for manufacturing the thin plate according to claim 4, wherein the conductive material component is C or $B_4C$.

12. A thin plate obtainable by the method according to claim 4, wherein the thin plate comprises a conductive material component that exists, without dissolving, in an amorphous metal matrix exhibiting corrosion resistance by passivation, and the thin plate is subjected to press-forming, having an internal pore crimped by the press-forming.

13. The thin plate according to claim 1, wherein the amorphous structure rate is 89-95%.

14. The thin plate according to claim 12, wherein the amorphous structure rate is 89-95%.

* * * * *